No. 895,785. PATENTED AUG. 11, 1908.
A. PALMROS.
MEANS FOR SUPPLYING AND CONTROLLING ELECTRIC CURRENT
TO MOTOR VEHICLES.
APPLICATION FILED SEPT. 12, 1900. RENEWED NOV. 19, 1906.
10 SHEETS—SHEET 1.
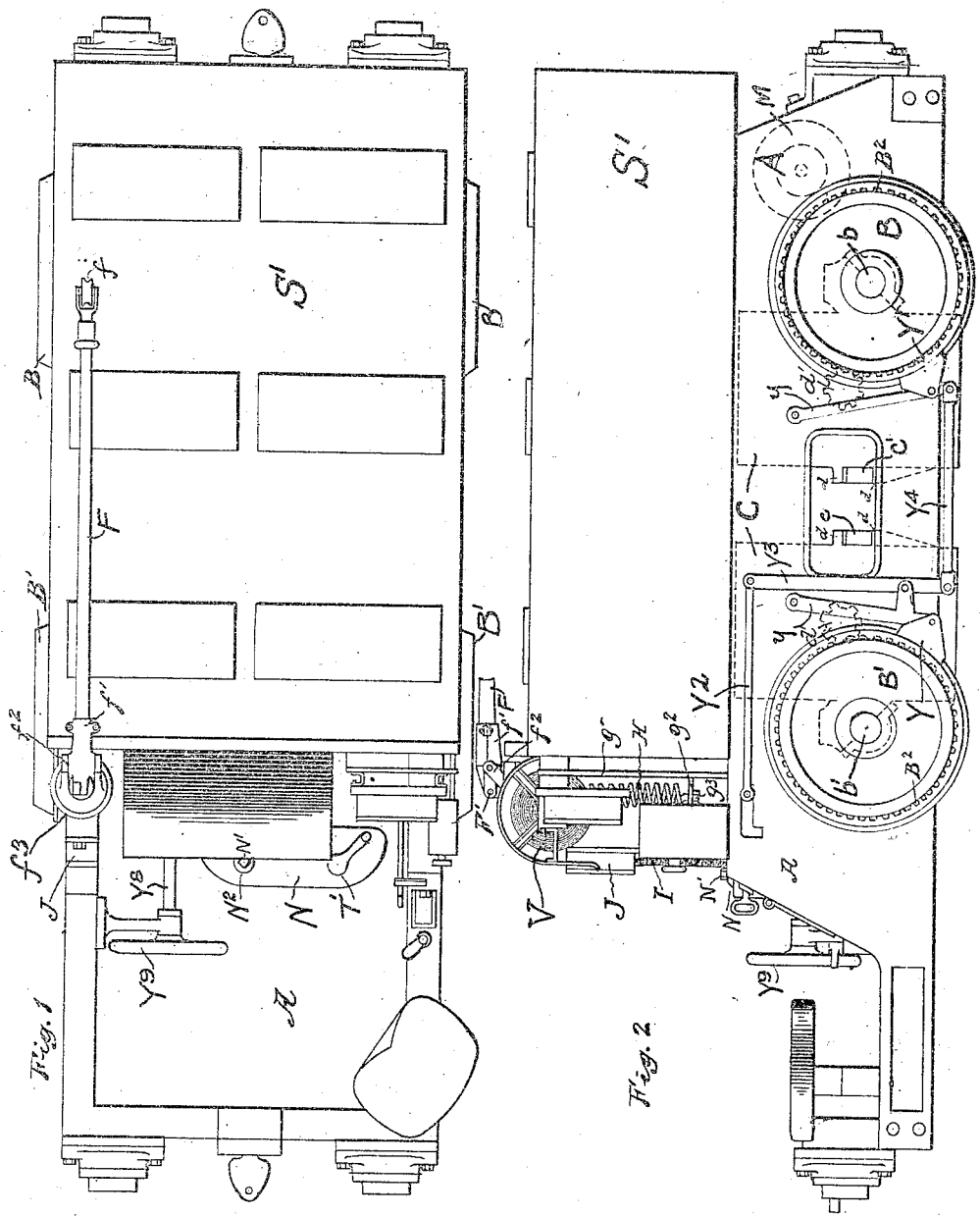
Witnesses
Albert H. Williams Jr.
O. R. Woodward
Inventor
Alexander Palmros
By H. H. Bliss
Attorney.

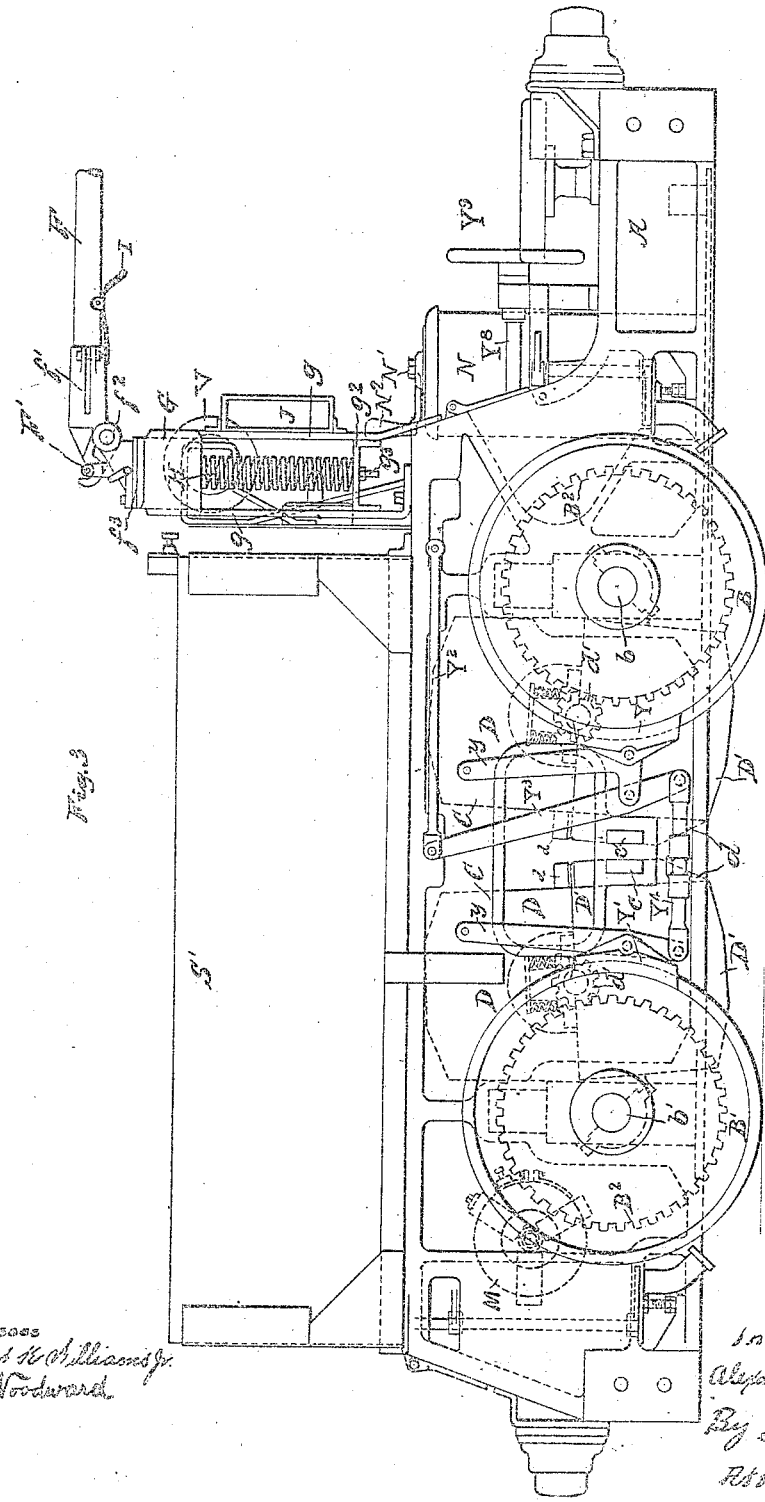

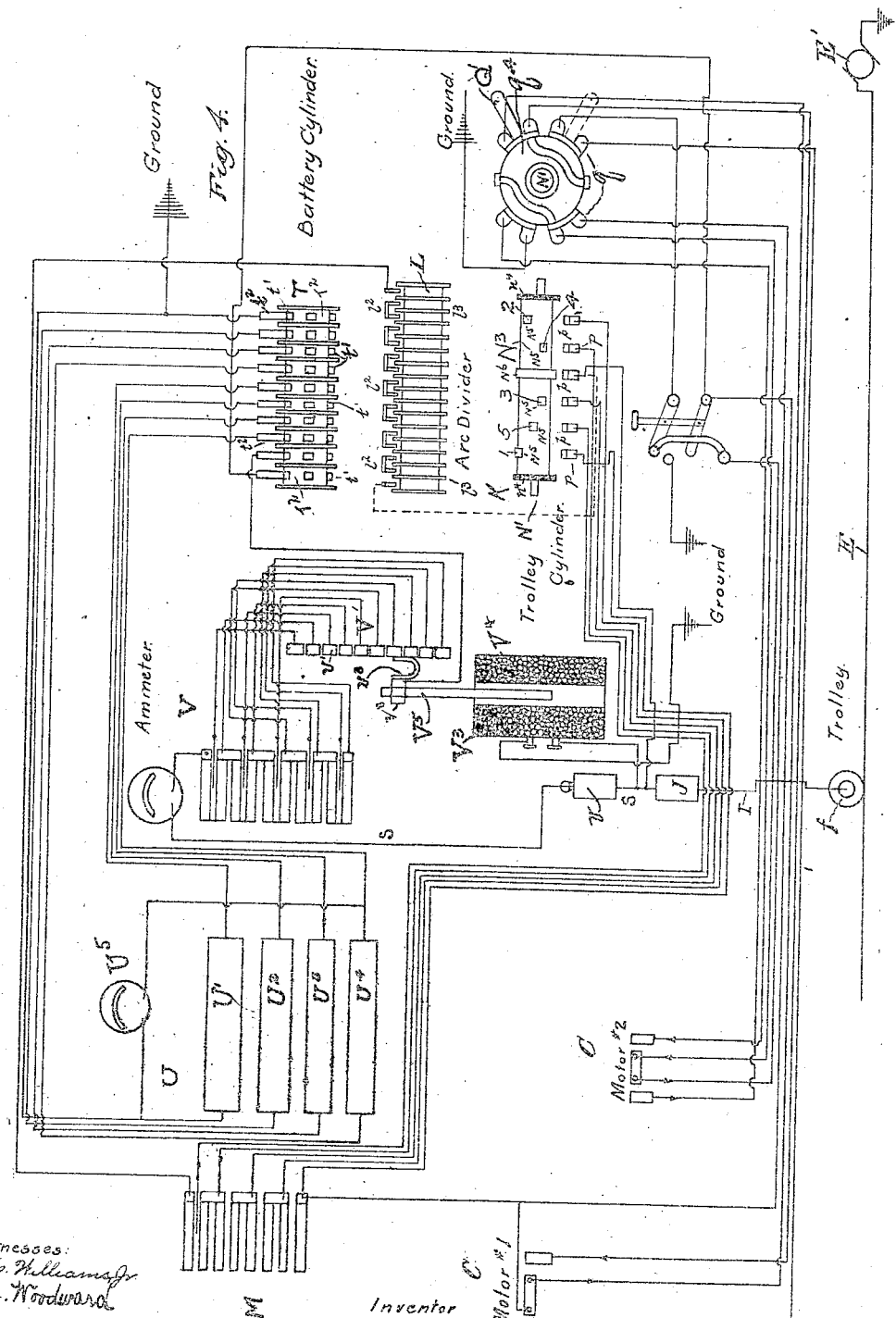

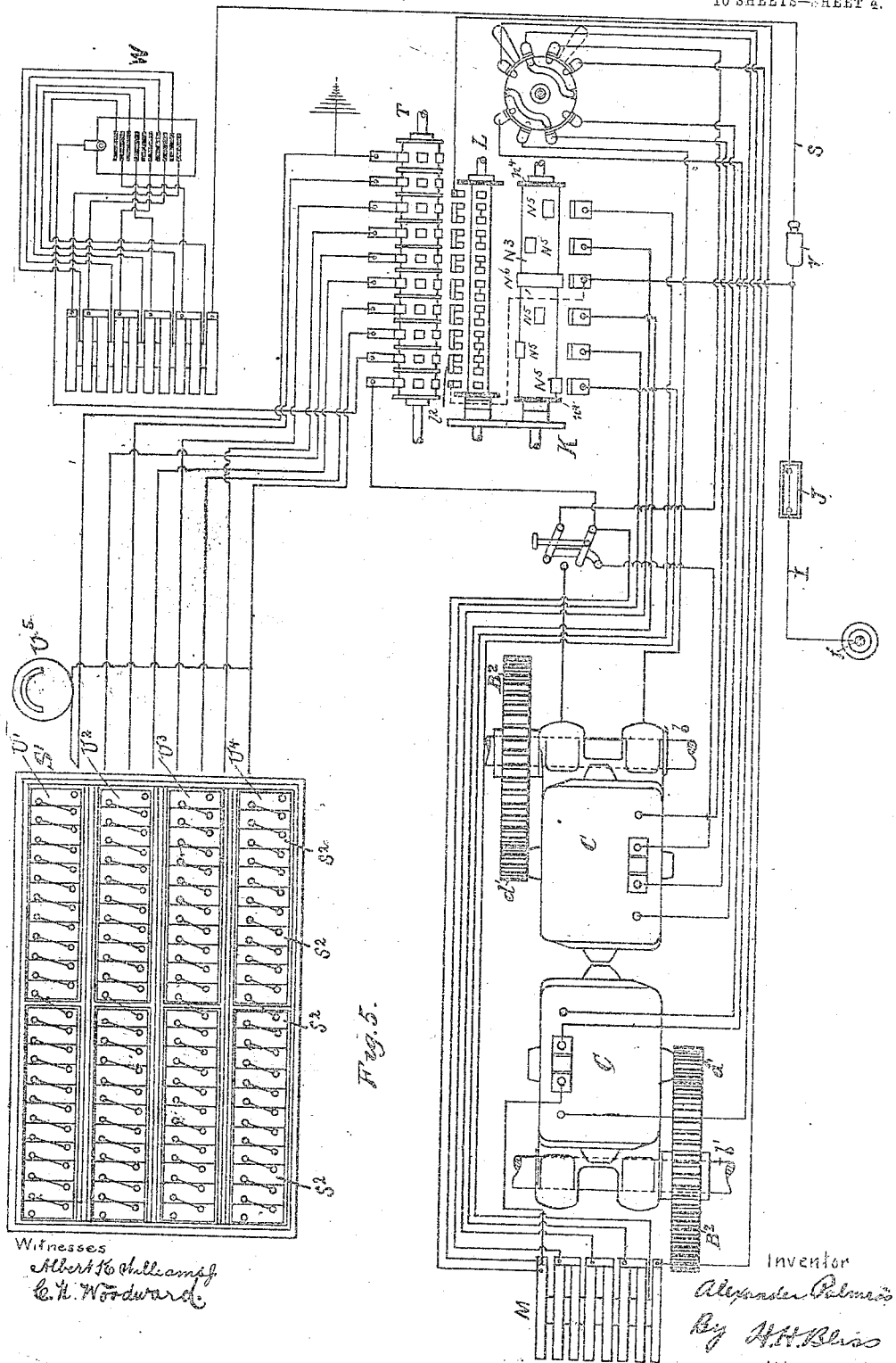

No. 895,785.
A. PALMROS.
PATENTED AUG. 11, 1908.
MEANS FOR SUPPLYING AND CONTROLLING ELECTRIC CURRENT TO MOTOR VEHICLES.
APPLICATION FILED SEPT. 12, 1900. RENEWED NOV. 19, 1906.
10 SHEETS—SHEET 5.
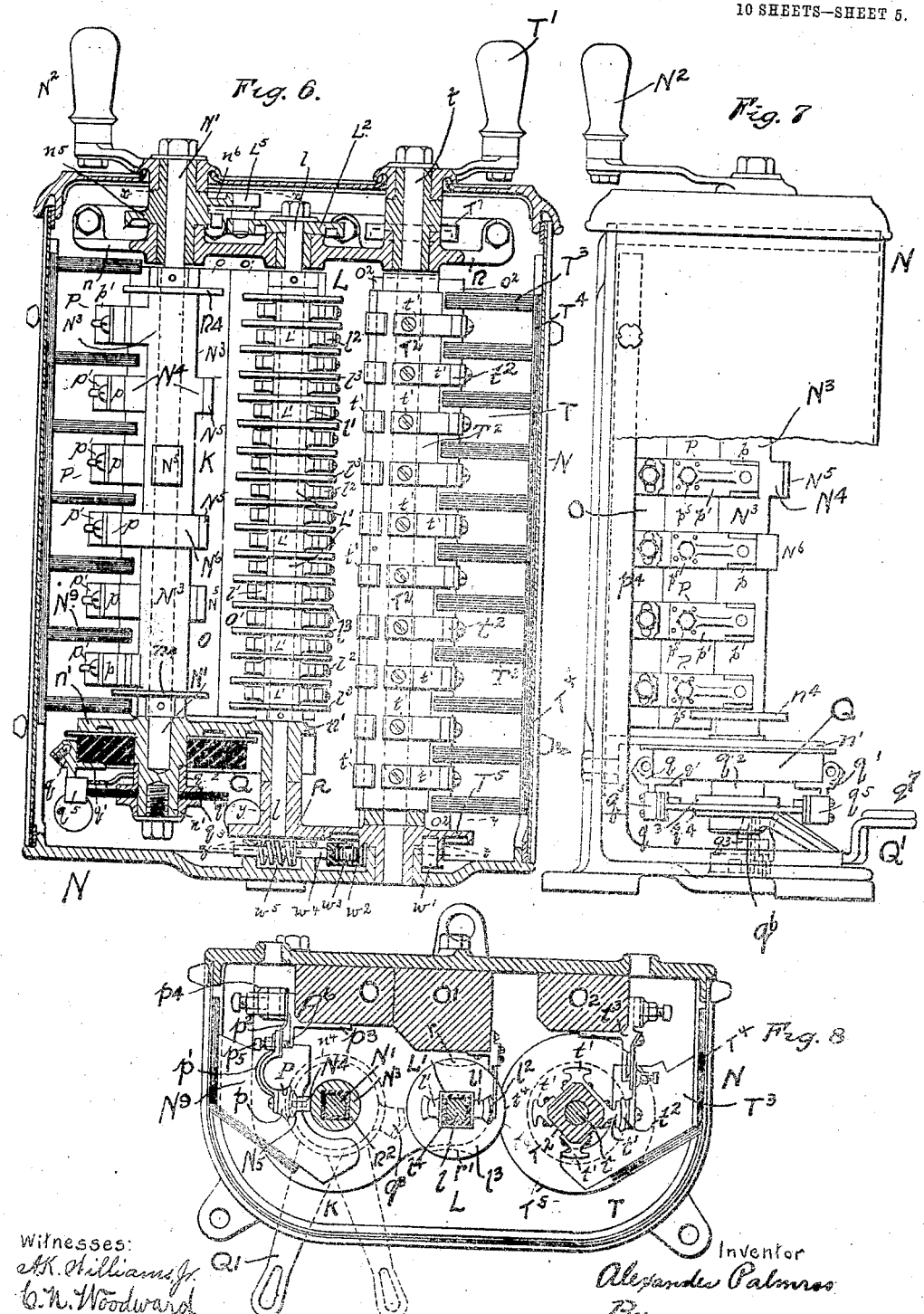
Witnesses:
A. K. Williams Jr.
C. N. Woodward
Inventor
Alexander Palmros
By H. H. Bliss
Attorney.

No. 895,785.　　　　　　　　　　　　　　　　PATENTED AUG. 11, 1908.
A. PALMROS.
MEANS FOR SUPPLYING AND CONTROLLING ELECTRIC CURRENT
TO MOTOR VEHICLES.
APPLICATION FILED SEPT. 12, 1900. RENEWED NOV. 19, 1906.
10 SHEETS—SHEET 6.
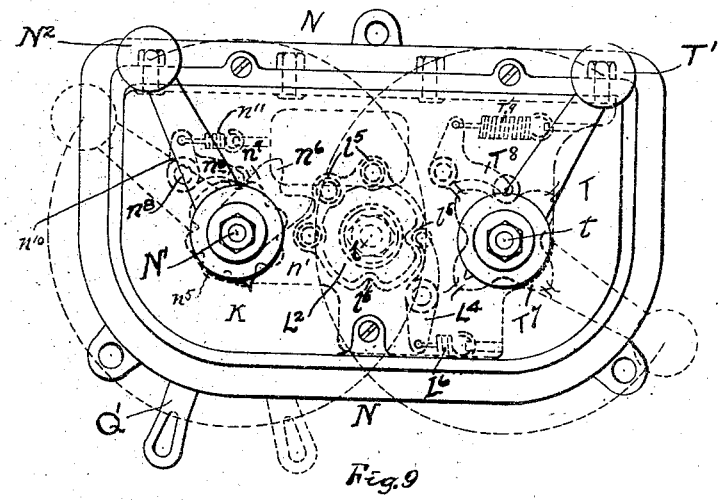
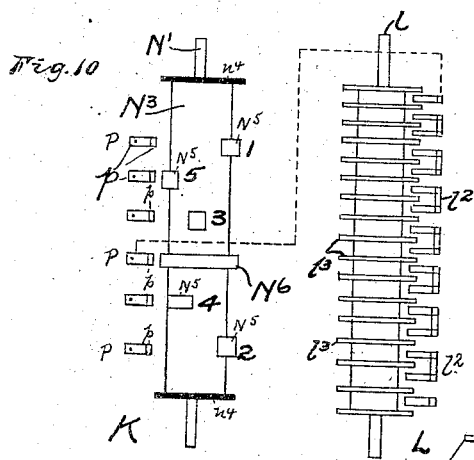
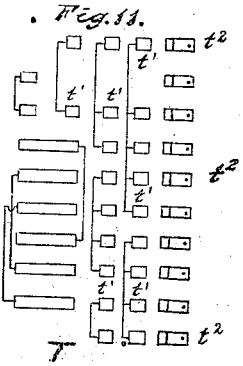
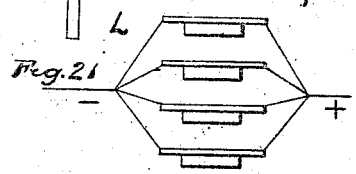
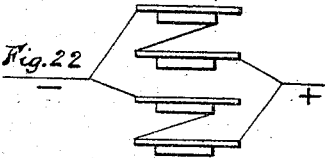
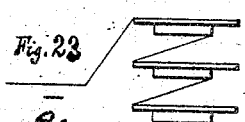
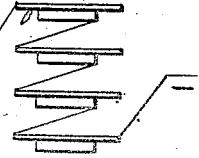
Witnesses:
Alexander Palmros
Inventor
By _____ Attorney No. 895,785. PATENTED AUG. 11, 1908.
A. PALMROS.
MEANS FOR SUPPLYING AND CONTROLLING ELECTRIC CURRENT TO MOTOR VEHICLES.
APPLICATION FILED SEPT. 12, 1900. RENEWED NOV. 19, 1906.
10 SHEETS—SHEET 7.
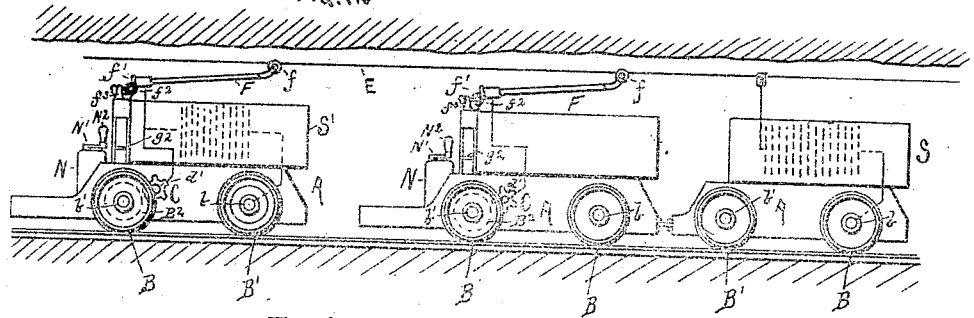
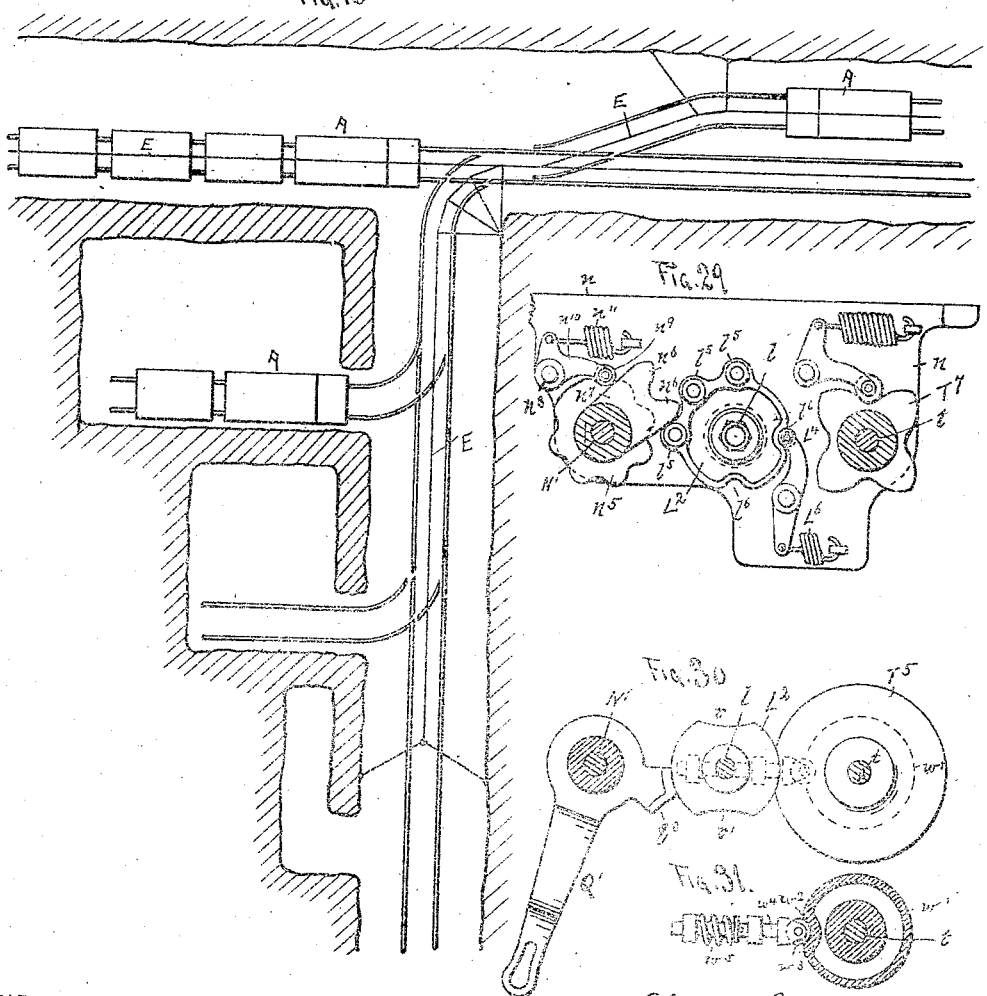

No. 895,785.
PATENTED AUG. 11, 1908.
A. PALMROS.
MEANS FOR SUPPLYING AND CONTROLLING ELECTRIC CURRENT TO MOTOR VEHICLES.
APPLICATION FILED SEPT. 12, 1900. RENEWED NOV. 19, 1906.
10 SHEETS—SHEET 8.
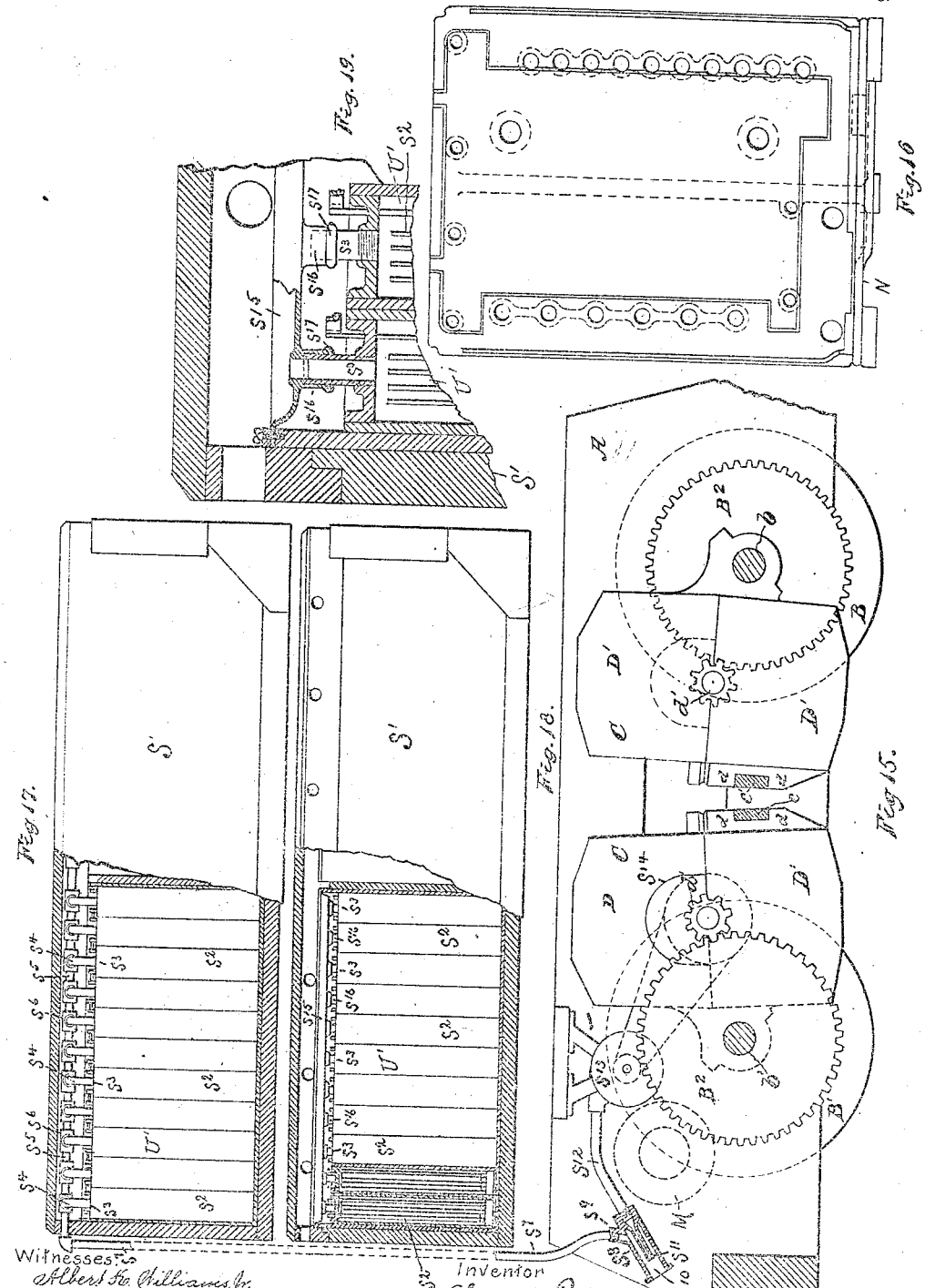

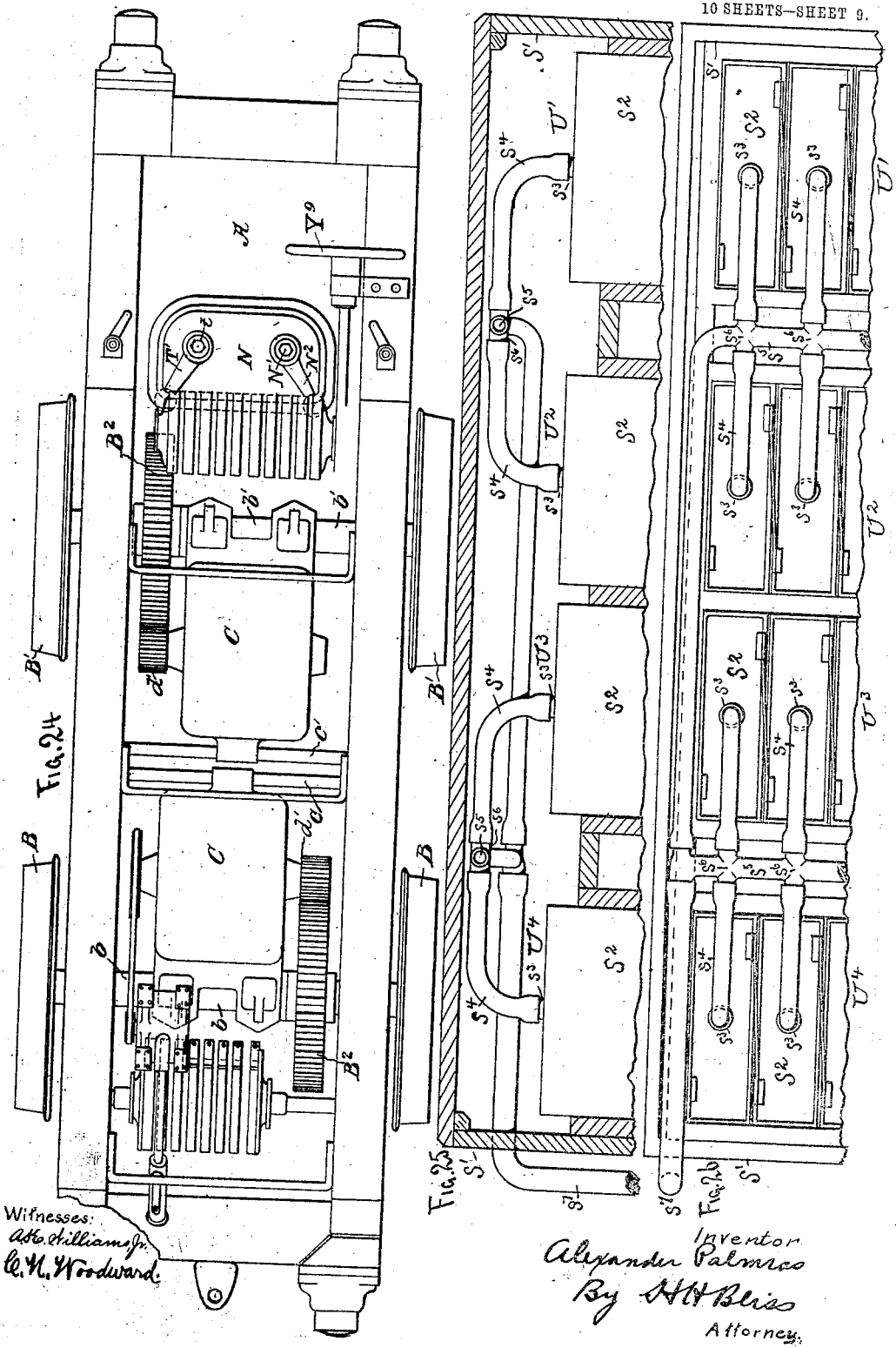

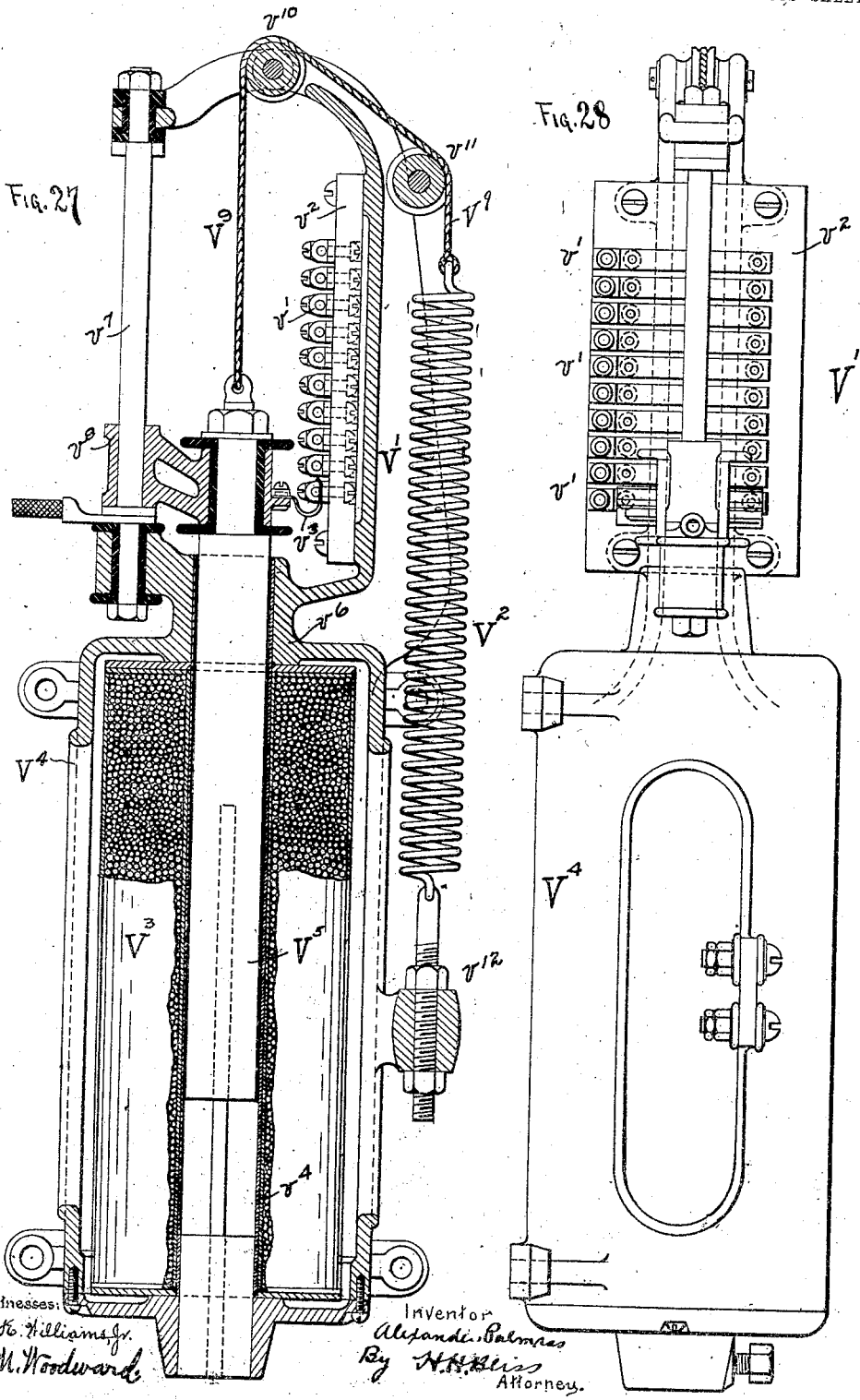

UNITED STATES PATENT OFFICE.

LEXANDER PALMROS, OF COLUMBUS, OHIO, ASSIGNOR TO THE JEFFREY MANUFACTURING COMPANY, OF COLUMBUS, OHIO, A CORPORATION OF OHIO.

MEANS FOR SUPPLYING AND CONTROLLING ELECTRIC CURRENT TO MOTOR-VEHICLES.

No. 895,785.      Specification of Letters Patent.      Patented Aug. 11, 1908.

Application filed September 12, 1900, Serial No. 29,778. Renewed November 19, 1906. Serial No. 344,154.

*To all whom it may concern:*

Be it known that I, ALEXANDER PALMROS, citizen of Finland, residing at Columbus, in the county of Franklin and State of Ohio, have invented certain new and useful Improvements in Means for Supplying Electric Current to Motor-Vehicles and for Controlling the Same, of which the following is a specification, reference being had therein to the accompanying drawing.

This invention relates to improvements in electric locomotives or motor cars and particularly to cars of the smaller sorts such as are used in mines or those adapted to be employed in restricted spaces.

The purpose of the invention is to provide a car which can be furnished with storage batteries and with apparatus for supplying current to such batteries and to the motor or motors upon the car, and devices for controlling the current; and also to provide batteries, circuits and controlling devices which will be available for use upon such cars.

Figure 1 is a top plan view of a car containing devices embodying my improvements. Fig. 2 is an elevation of one side thereof. Fig. 3 is an elevation from the opposite side thereof. Fig. 4 is a diagram illustrating the relations of the several operative parts and their electrical connections. Fig. 5 is a diagram illustrating a modified mechanism. Fig. 6 is a vertical section of the controller apparatus for introducing and regulating and shutting off the current. Fig. 7 is a view in side elevation, part of the box or casing being removed. Fig. 8 is a horizontal section of the same. Fig. 9 is a top plan view of the controller. Fig. 10 is a diagrammatic or conventional view showing controller barrel, with its stationary contacts, together with the arc dividing apparatus. Fig. 11 is a diagram showing the electrical relations of the parts of the battery controller. Fig. 12 is a view illustrating the manner of using a mine vehicle containing the improvements herein referred to. Fig. 13 is a plan view of a section of a mine, illustrating the application of my invention. Fig. 14 is a bottom view of the current reversing mechanism. Fig. 15 is a longitudinal section of more or less of the car and of the motors thereon. Fig. 16 is a rear view of the controller casing. Fig. 17 is a longitudinal section of part of the battery. Fig. 18 is a longitudinal section of a modified form of the battery and its holder. Fig. 19 is an enlarged section of part of the same. Fig. 20 is a diagram illustrating the relations of the cells or cell sets to each other at the time of charging. Figs. 21, 22 and 23 are respectively diagrams illustrating the three arrangements of the cells when the battery is discharging at different speeds. Fig. 24 is a plan view of the locomotive, with the cell casing removed. Fig. 25 is a cross sectional view, enlarged, of the upper end of the cell casing illustrating the modification shown in Fig. 17. Fig. 26 is a plan view of the same. Fig. 27 is a sectional side elevation of the automatic battery current controlling apparatus. Fig. 28 is a front view of the same. Fig. 29 is a detail of the controller locking mechanism in section on the line $x, x$ of Fig. 6. Fig. 30 is a similar view on the line $y, y$ of Fig. 6. Fig. 31 is a sectional view on the line $z, z,$ of Fig. 6.

In the drawing, a car is shown having a main body part indicated as a whole by A, and supported upon the track wheels B, B'.

At C C there are motors. As shown they are hinged to the axles $b$ and $b'$ respectively; the opposite ends of the motors projecting toward each other and toward the center of the car, said inner ends being supported by bars $c, c'$ which extend across the car. These motors are formed with an upper and lower field part D, D', the upper part being removable from the lower, and they are formed with lugs or projections $d$ which extend above and below one of the cross bars $c$ to hold the motor in position. The motor is geared in the usual way to the axle by means of the pinions $d'$ and the gear wheel $B^2$ secured to the axle.

The motors may, as concerns their electrical details, be of any nature suitable for the purpose intended. In the present case, as will be explained below, the design being to employ both a dynamo-electric current and current from a battery whose cells are arranged to act with a tension equal to that of the dynamo current, the motors are constructed as concerns their winding and other details in such way as to adapt them for dynamo current. Where battery current alone is to be utilized, the details can be modified according to the ways in which the current from the cells is to be passed to the motor.

I will first describe the parts and their relations to each other, by which current is taken to the motors by a line conductor in a way more or less similar to that commonly followed.

E indicates the main line conductor extending from dynamo at E' parallel to the vehicle track. The car is provided with a universally adjustable trolley mechanism, more or less similar to some that have been in use, differing therefrom to some extent in its mounting and arrangement, as will be explained.

The trolley wheel $f$ is carried at the outer end of the pole F, the latter being secured to the socket $f'$, which is pivoted in the now common way at $f^2$ on a horizontal axis, the pivoted support $f^3$ being tubular and fitted in a tubular socket G, the latter being on a vertical axis. The sleeve $f^3$ is rotated horizontally, and consequently the pole has universal adjustment, considering the two axes at $f^2$ and $f^3$. The tubular holder G is sustained by uprights or standards $g, g$, which are bolted to the top part of the car A. The preferred mode of connecting the holder thereto being that shown, i. e. the forming of grooves on the outer faces of the part G which receive the upper ends of the standards $g, g$, there being bolts to secure standards and motors together. At $g^2$ there is a step or cross bar bolted to the standards near their lower ends. The short arm of the socket piece $f'$ of the trolley pole is detachably hinged to an eye clevis F' which at its lower end is connected to a coiled spring H, this spring extending from the trolley pole down to the cross bar $g^2$ and fastened to the latter by the clamping device at $g^3$, as illustrated.

Preferably an insulated conductor wire I is attached to the trolley pole F, and at the lower end of the pole the wire is carried to the fuse box at J, which is also supported on the aforesaid uprights $g, g$. From the fuse box a conductor is carried to the controller to be described, there being another or branch conductor extending to the storage cells, see diagrams Figs. 4–5, as will be set forth below.

First, considering the action and manipulation of the parts used when employing the dynamo current, it will be seen by reference to Figs. 1 to 11, that I employ means for controlling the direct passage of the current to the motors from the trolley, also an arc divider, and also a resistance, the ordinary controller cylinder and its several adjuncts being indicated as a whole at K, the arc-divider at L, and the resistance at M.

The controller cylinder and its coöperating parts used for controlling the passage of the current from the trolley direct to the motors is placed within the casing at N, which also contains a number of other parts to be described. This casing is secured to the body part A of the car, as illustrated, for many reasons it being preferred to have it placed near one end of the vehicle.

N' is a vertically arranged shaft mounted in the bearings at $n, n'$ at the top and bottom of the said casing. This shaft is provided with a handle N² above the casing, by which the operator can rotate it as desired. Between the top and bottom bearings it has an elongated tube N³ secured to it.

The tube and shaft are connected together, so that they rotate in unison, preferably by forming the shaft square or angular in section, and passing it through a correspondingly shaped aperture $n^2$. The tube N³ is insulated from the shaft and the frame or casing, there being insulation between the shaft and the tube, and insulating disks or washers at $n^4$.

The tube N³ is cast or provided with contact lugs N⁴. To the outer end of each of these there is detachably secured a contact and wearing piece N⁵, each being fastened by screws, as shown. In opposition to the rotary contacts thus provided is a series of stationary contacts that are connected respectively with the several elements of the resistance M, and are mounted and arranged as follows: O is an insulating bar of wood suitably secured to the rear wall of the casing N. Each stationary contact device is indicated by P, and is made and arranged as follows. The contact proper is shown at $p$, which is held resiliently by a yielding carrier $p'$, the latter being secured to a spring at $p^2$, so arranged as to hold the contact piece $p$ in or near the path of the rotary contact N⁵, and at the same time is adapted to yield therefrom. The fastening for the stationary contact is effected by means of a bracket piece $p^3$, which is secured to the insulating bar O. At $p^4$ there is a clamp for the end of the wire or cable, by which the current is brought to the contact piece $p$ that it may be transmitted to the tube N³.

At $p^5$ there is an adjusting screw engaging with the carrier $p'$ of the contact, and bearing against an ear or projection $p^6$, and by means of which the position of the stationary contact $p$ can be accurately adjusted.

The controller or commutating cylinder is connected to the arc-divider L as follows: The arc-divider has a shaft $l$ mounted in the bearing plate $n$ at the top, and "stepped" into the bearing plate $n'$ at the bottom. This shaft $l$ is provided with a series of collars L' each having a pair of contact arms $l'$. A series of stationary contacts $l^2$ is provided, they being supported on insulating bar O'. Between each pair of contacts $l', l^2$, and the next pair, there is an insulating disk $l^3$ to prevent short circuiting between neighboring contacts. And the hubs L' are insulated on shaft $l$ as shown at $l^4$ in Fig. 8.

The shaft $l$ and its contacts $l'$ are so related to stationary contacts $l^2$ and the shaft N′, that at certain times the contacts $l'$ touch those at $l^2$, and numerous parallel paths are provided for the current; but at other times, as for instance just before the current is to be shut off from the motor, these contacts are all simultaneously separated, and sparking is thereby prevented at the instant of switching out.

The movement of the shaft $l$ and the arc-divider contacts is effected by means of mutually engaging parts carried by the two shafts N′ and $l$. At the upper end of the shaft $l$ there is a plate or disk-like device $L^2$, which has teeth or rollers $l^5$. As shown there are three of these rollers. The shaft N′ has an arm $n^7$ with projections $n^6$, the latter being somewhat similar to gear teeth, and adapted to fit between and engage with two of the teeth or rollers $l^5$. It will be seen that when the crank $N^2$ is turned in one direction it causes the projections $n^6$ to engage with the teeth or rollers $l^5$, and imparts a partial rotation to the shaft $l$; after such partial rotation of the shaft $l$ the shaft N′ is disengaged therefrom and remains so during the remainder of its movement around its axis; and when it is reversed the projections $n^6$, as they return towards their original position, can engage reversely with the parts $l^5$ and reverse the shaft $l$, or return it to its first position.

Each of the shafts N′ and $l$ is provided with locking or stopping devices which engage with it in each of its several positions, and hold it temporarily in such position.

As shown, the shaft N′ is provided with a toothed or notched disk $n^5$, and with this a vibratable spring actuated dog $n^{10}$ engages, the latter being pivoted at $n^8$, and having a spring $n^{11}$ which tends to hold the free end of the dog and its roller $n^9$ normally in that notch of the disk $n^5$ which is the nearest to it. Similarly the shaft $l$ has a disk $L^3$ with notches at $l^6$, with which the locking dog $L^4$, actuated by the spring at $L^5$, engages.

At the lower end of the shaft N′ are arranged the devices by which the current is reversed through the motor.

Q is an insulating plate or board of wood, or equivalent material. It supports a series of contacts, each of which is indicated as a whole by $q$, and each is formed with the angle bracket $q'$ secured to the insulating plate Q. Below the part Q is the rotary part of the reversing device, which consists of a hub $q^2$ with a disk $Q^3$, to which is fastened an insulating disk $q^4$, the latter carrying a series of rotary contacts, each indicated as a whole by $q^5$.

Q′ is a lever having a hub or eye $q^7$ secured to the parts $q^2$, $q^3$, $q^4$, projecting outwardly through the casing N, and which can be moved to the right or left, as required. Being at the lower end of the controller shaft, this lever Q′ is adapted to be operated by the motorman's foot. But, such operation of the reversing parts is not possible except at predetermined times, that is to say at the time when the shaft N′ is in its initial position, and the circuit through the controller is broken. To insure that the reversing device shall be thus prevented from movement, except at the time aforesaid, I employ a disk R on the lower end of the arc-divider shaft $l$, this disk having a recess or part of its periphery cut away, as shown at $r$. Then the collar or hub piece $q^6$ of the lever Q′ has an arm $q^8$, which is of such length as that when the circular part of the periphery of the disk R is turned towards the shaft N′, the arm Q′ cannot turn; and when the recess at $r$ is turned towards said shaft, the arm $q^8$ has a free path, and at such time the lever Q′ can be moved and the circuit contacts at $q$ can be reversed.

By referring to Fig. 9, it will be seen that as the shaft N′ of the controller tube or barrel K starts to rotate, its first action is to partially rotate the arc-divider cylinder through the parts at $n^6$ and $l^5$, this occurring at the first step. At that time the current passes directly to the arc-divider and from there to the first terminal of the resistance M, thence through all the elements of the resistance in series, and thence to the motor. It will be further seen that as the controller tube or cylinder $N^3$ passes through its next step in rotation it brings one of the stationary contacts $p$ into contact with the longer rotary contact $N^6$. And, at the same time brings another of the stationary contacts into contact with one of the shorter rotary ones, and simultaneously disengages the controller tube or cylinder and its shaft from the shaft of the arc-divider. Thereafter, the rotary contacts and the stationary contacts of the arc-divider remain in contact. When the controller contacts are in the position just described, the first element of the resistance is cut out, and a correspondingly larger flow of current is permitted. Afterward the controller tube is rotated through its several succeeding steps, and the elements of resistance are cut out one after the other until they are all eliminated, and the current passes directly through the contact $N^6$ of the controller to the motors.

Inasmuch as one side of the circuit in the mechanism herein is grounded, there is danger that the current at high tension will spring from the contacts at $N^4$, $p$, both from one to the other, and from these to the metal of the surrounding casing and frame. The first tendency is overcome by means of the insulating separators at $N^9$ which extend inward from the casing into the spaces between the pairs of rotary and stationary contacts, and also by having the contacts of the series so connected up and so related to each other in their position that no two successively acting contacts are near enough together to permit any dangerous springing of the current from one to the other, as they are covered and uncovered. The other tendency is overcome by having the final breaking point of the controller cylinder situated as far as possible from its ends, that is to say as near as practicable at its center longitudinally, where it shall be remote from the grounded metal of the casing and frame, and can be surrounded with an abundance of insulating or separating material.

It will be seen by noting the position of the long contact $N^6$ and of the shorter ones $N^5$, in relation to their respective opposed stationary contacts, that both when the current is being taken into and when it is being cut out from the motor, that the breaks occur successively at points as remote from each other as is permitted by the length of the cylinder or tube $N^3$. Thus, if the parts be arranged as shown, when the controller is being turned to cut the current off, the first break will occur at a point near one end of the tube, or at the lowermost contact $n^5$; the next will occur at a remote point near the other end of the tube, or at the uppermost contact $n^5$; and next at a point again on the other side of the center, and so on alternately from one end of the tube to the other. Consequently, the distance for the current to travel when the controller is making the successive breaks and contacts, is so great that an arc cannot form between any two successively acting contacts, and it will be seen that the central elongated contact $N^6$, (where the final break occurs), is so remote from the metal of the casing and frame, that the tendency to form an arc at such contact points is overcome.

As above remarked, and returning to that part of the circuit indicated by S, it branches, the branch indicated by S, Figs. 4 and 5, leading to the storage battery. This battery consists of a series, of suitable number, of cells $S^2$, the series indicated at $U'$, $U^2$, $U^3$, $U^4$, being held and contained in the box or receptacle $S'$. As shown, this receptacle is so arranged as to rest upon and cover the greater part of the top of the car A. The cells are arranged therein compactly, and are connected up so as to form four sets, and these sets are capable of being put in circuit in any one of three ways, namely; 1st. all in multiple, as shown in diagram at Fig. 21; 2nd. in such way that there shall be two pairs of the sets, those of each pair being in series with each other, and the two pairs being in multiple, as shown in diagram in Fig. 22; and, 3rd, so that all four sets shall be in series, as shown in diagram in Fig. 23.

The commutating or controlling mechanism for varying the relations in which the cells or sets of cells are thus connected up, is indicated as a whole by T, which comprises the following parts: $t$ is a vertical shaft mounted in the top bearing hanger plate $n$, and stepped in the bottom plate of the casing N, and provided with a crank handle $T'$ for rotating it. This shaft $t$ between its top and bottom bearings is provided with an insulating tube $T^2$ of wood or other suitable material, and analogous to the tube K above described on the shaft $N'$. This tube $T^2$ carries a number of rotary contacts $t'$ adapted to bear against spring held contacts $t^2$, which are supported by brackets $t^3$ secured to the insulating bar $Q^2$, the springs connected thereto, and the contacts connected to the springs, being substantially similar to those above described and indicated at $p$, $p'$, $p^2$, $p^3$, $p^4$, $p^5$ and $p^6$.

In the spaces between the pairs of contacts $t'$, $t^2$ are arranged insulating plates $T^3$, supported by a common insulated back or carrier board or plate $T^4$ secured to the casing N. The insulating devices $T^3$ insure that the current shall not spring from one pair of contacts to another, and shall not spring from the contacts to the casing. It is unnecessary to describe in detail all of the possible permutations or combinations of the sets of cells at $U'$, $U^2$, $U^3$, $U^4$ of the storage battery. Suffice it to say that the commutator or controller T, together with its rotary contacts $t'$, and adjacent stationary contacts $t^2$, are so arranged that when the shaft $t$ and its cylinder are in their initial position, the said contacts and the connecting wires bring all the cells or cell sets $U'$, $U^2$, $U^3$, $U^4$, into series relationship, and this is the position which they occupy when the battery is being charged. But, if the cylinder $T^2$ and shaft $t$ be turned one quarter way around, so as to bring its next longitudinal series of contacts against the stationary contacts $t^2$, the grouping of the cells or cell sets will be varied so as to throw them all in multiple in the way illustrated in the diagram Fig. 21, and this is the first position in relation to each other in which they are thrown when the discharging of the battery commences. If, then, the cylinder $T^2$ and shaft $t$ be turned another quarter of a revolution, the third set of rotary contacts $t'$ engage the contacts $t^2$, and thereupon the cells or cell sets are connected up in the way illustrated by the diagram Fig. 22, that is to say, into two pairs of sets, those of one pair being in series and the two pairs being in multiple. Finally, if the cylinder $T^2$ and shaft $t$ be turned another quarter of a revolution, it brings its fourth set of contacts in engagement with the stationary contacts $t^2$, and thereupon the cells or cell sets are connected up as in diagram Fig. 23, that is to say, so that all are in series, and this is their relative positions when the battery is working to its fullest capacity in discharging through the motor. In Fig. 20 is shown a diagram illustrating the arrangement of the cell sets to each other during the "charging".

The battery controller T and the direct current controller K, are so related to each other that neither can be manually operated while the other is in any except its initial position. That is to say the battery controller cannot be moved from its initial position, if the direct current controller is in use, and vice versa, the latter cannot be moved from its initial position so long as the battery is so situated as to have the cells in discharging action. Such a reciprocal stoppage of the one by the other can be attained in any of several ways. I have illustrated the means for accomplishing this which I at present prefer. The aforesaid disk R on the shaft $l$ is provided with a cut out or recess $r'$ opposite to that at $r$. On the lower end of the shaft $t$ there is a disk $T^5$ secured to the shaft, and having a recess $t^4$. When the shaft $l$ is in its initial position the recess $r'$ is opposite the recess $t^4$, and at such time the shaft $t$ and its contacts $t'$ can be rotated. But if the shaft $l$ and its disk R are turned into any other position, that is any position in which the circular part of the periphery of the disk R is opposite the disk $T^5$, the latter cannot be rotated because of the fitting of the disk R into the recess $t^4$.

From the above, it will be seen that the battery cylinder can take three distinct steps. As it passes through these steps, that is passes from one set of contacts $t'$ to the next, there is a complete breaking of the circuit to overcome any possibility of the short circuiting of the cells of the battery. To insure that the controller shall stop only in such positions as will bring one or the other of its sets of rotary contacts against the stationary contacts, I provide a set of center locking devices. These consist of a notched or recessed disk $T^7$ near the upper end of the shaft $t$ and secured to it. The notches or teeth therein corresponding to the several series of contacts on the cylinder $T^2$. $T^8$ is a hinged dog or lever adapted to engage with this disk and held forcibly against it by the spring $T^9$. These parts insure that one set or another of the contacts on the cylinder shall always be against the stationary contacts.

A switch or cut out mechanism of any suitable sort can be used for shutting the current from the trolley entirely off from the battery, or for letting it on, and this can be placed at any proper point. At $v$ I have shown such a device, it being preferably in "plug" form.

For assisting in controlling the battery, both in charging and discharging, use can be made of a supplemental resistance as at V. This may be so arranged in relation to the battery circuits that it can be operated by hand or automatically, as preferred.

While a regulating apparatus of the sort now being described may be used under many circumstances, it is principally advantageous in connection with mining plants, where use is made of locomotives, cutting and drilling machines, pumps, and similar devices. In such plants, over compounded generators are frequently used to provide compensation for the great drop of voltage in the feeder lines, which causes fluctuating voltage with fluctuating load. Storage batteries cannot be advantageously used where there is this fluctuating voltage, and it is desirable to provide some means for regulating it in order to prolong the life of the battery.

In Figs. 27 and 28 I have shown, more or less in detail, a mechanism for automatically controlling the action of the current and the battery, and in Fig. 4 there is a diagrammatic illustration of these parts in relation to the entire apparatus.

$V'$ is a commutator having a series of stationary contacts $v'$ secured to the insulating support $v^2$ and a sliding contact $v^3$. The contacts $v'$ are terminals of circuit sections connected with the elements of the resistance V in such way that more or less of said resistance will be cut into the main circuit according as the sliding contact $v^3$ engages with one or another of the contacts $v'$.

The sliding contact $v^3$ is moved in one direction or the other by the current on the main line. As shown it is arranged to be operated by an electro-magnet $V^3$ acting in opposition to a spring $V^2$, the latter tending to move the contact $v^3$ so as to cut out resistance, and the magnet acting to move it so as to introduce resistance. The electromagnetic device here selected is of the solenoid form. The magnet coil surrounds a tubular passage $v^4$, within which is a core $V^5$. The magnet is arranged within a case $V^4$, which can be secured in any suitable position.

The end $v^6$ of the casing furnishes a support for the commutator terminals $V'$, and their insulator support $v^2$, and also support for the guide $v^7$ of the core $V^5$, the latter having a guide eye $v^8$ fitted to the guide $v^7$. The spring $V^2$ is connected to the core by a cord $V^9$ which passes over guide rollers $v^{10}$, $v^{11}$, one end of the spring being adjustably secured to the casing wall as shown at $v^{12}$.

It will be seen that when the current is relatively stronger the solenoid will draw the core $V^5$ longitudinally into it, moving the contact $v^3$ in such way as to introduce gradually elements of the resistance, and vice versa.

The solenoid circuit is a branch from the main circuit independent of the other branches, and consequently the position of its core will depend entirely upon the main circuit.

As the solenoid magnet is as above stated, in its own branch circuit directly between the main line and the ground return, it is constantly receiving the full pressure of the line, and if there be any variation in the line voltage there will be of course a corresponding change in the amount of current flowing in this solenoid. This will be followed by a corresponding variation in the magnetic pull on the core $V^5$. As the spring $V^2$ counteracts the magnetic pull, an increase in voltage on the main line will cause the core $V^5$ to put more resistance into the battery circuit, and to that extent will decrease the charging effect, the spring $V^2$ constantly tending to act in opposition. In many cases this automatic regulation of the current passing through the battery is not necessary, and if resistance is required it can be introduced or cut out by any suitable hand operated device. In Fig. 5 there is a diagrammatic illustration of the electrical parts of the locomotive when they are so modified, provision being here made also for operating the car, either directly from the main conductor wire, or for charging the storage battery from that wire and in turn propelling the car from the battery. In this case, the automatic regulator having the parts $v'$, $v^2$, $v^3$ and adjuncts, is dispensed with, and in place thereof a resistance at W is employed. This being adapted to be used in introducing more or fewer of the resistance elements. In such a case the mode of operating the mechanism is as follows. While the car is moved along those parts of the track which are supplied with an overhead wire F connecting with the distant dynamo E', the current is taken by the trolley $f$ from the wire F and is conducted to the motors C, under the regulation of the controller K in the way described. While the car is being thus operated some of the current also passes to the storage battery U, assuming that the switch or plug at $v$ is closed, the cells or cell sets of the battery at such time being in series. If now the vehicle has reached a point in the track system where there is no trolley wire, and it becomes desirable to still propel it electrically, the motorman throws the controller K to its initial position and then draws the trolley wheel $f$ away from the wire F, whereupon the battery controller is unlocked and can be turned to either of the three speed positions, and permit the discharging of the battery through the motors, and thus operate the locomotive entirely by the storage batteries.

In order to have constant indication of the condition of the battery, use is made of the voltmeter $U^5$ in connection therewith, it being inserted between the terminals of the battery.

After the car has been returned to that point of the track which is provided with the overhead wiring F, the battery controller T is again moved to its initial position, and the trolley $f$ is returned to the wire, whereupon the charging of the cells recommences and continues as long as may be found necessary, according to the indications of the voltmeter $U^5$. As soon as the meter shows that no further charging is necessary the operator can stop that process by opening the switch or drawing a plug at $v$.

Serious trouble is experienced in the use of storage batteries in cars of the class herein contemplated. Such a vehicle and everything carried thereby, must occupy a very small space longitudinally, transversely, and vertically. The active material of the battery therefore must be arranged in a very small space.

It is impossible to extend the cell cups any material distance above their electrolyte conditions. Hence, the jars or jolts frequently experienced by the vehicle causes the acid or liquid contents to be dashed upward and slopped over the tops of the cells. The cells and their holder $S'$ and the terminals of the plates, are rapidly corroded, short circuiting results, and the whole battery is speedily impaired. To overcome this dashing and spilling of the liquid contents of the cells, they have been heretofore tightly sealed at the top, and this in turn has been found to endanger the battery from another destructive agency, to wit, the gases constantly being generated during the charging; these gases being highly explosive. With respect to this liability to explosion, batteries treated in the way which characterizes the present improvements are principally dangerous inasmuch as the charging is effected at frequent intervals, and while the car is in use along the track, in contradistinction from the removal of the cells from the car and charging them in a special storage room, which can be freely ventilated during the charging period. Here the liquid must be in not only tight cells, but as stated are subject frequently and for irregular periods to the action of the current, and therefore there is a liability to have explosive gases present at all times unless special provision is made for keeping it free from them. Therefore, I do not tightly seal the tops of the cells $S^2$ but provide them with small apertures and tubular mouth pieces $S^3$, see Figs. 17, 18, 19, 24 and 26, and connect these mouth pieces with a common receptacle of such nature that the liquid which dashes upward through the mouth piece and spills over it shall be caught and prevented from running downward to come in contact with the cells, or any part which can be corroded thereby, and thus preventing it from short circuiting any parts of the battery. One device for accomplishing this is shown in Figs. 17, 25 and 26. $S^4$ are rubber tubes connected with the mouth pieces $S^3$ at the tops of the cells. These tubes connect with a duct $S^5$, which is preferably made up of a series of "T" or "TT" couplers $S^6$, and intermediate sections of tubing $S^5$, and is connected to an outlet duct $S^7$. The T couplings $S^6$ are designed to receive the ends of the rubber tubes $S^4$. In this way a common duct or receptacle is provided which connects with all of the cells into which all of the escaping acid or liquid can be gathered. The outlet duct $S^7$ communicates with an ejector $S^8$ having a receiving mouth at $S^9$, and a delivery orifice at $S^{10}$, together with a jet nozzle $S^{11}$. With the latter there is connected a tube or hose $S^{12}$, the latter being also connected to a blower $S^{13}$ which is driven by a motor $S^{14}$, or the blower can be connected to the car axle, so that when the vehicle is in motion the blower will be actuated. The air that is forced through the jet nozzle $S^{11}$ acts on the well known principle of the injector, and causes suction through the mouth $S^9$ from the duct $S^7$, so that any liquid which may have escaped from the cells $S^3$ will in this way be drawn away from the battery and caused to escape at any suitable point where it will effect no damage. A modified mechanism for this purpose is shown in Figs. 18 and 19. In this case use is made of a tray or basin-like part indicated by $S^{15}$. It has small apertures $S^{16}$ whereby it can be fitted tightly to the mouth pieces $S^3$ of the cells. Preferably I form this basin-like part $S^{15}$ out of soft flexible sheet rubber. The body part of it can be comparatively thin, but where it is connected to the cell mouth $S^3$, I provide it with thickened tubular reinforcements $S^{17}$, adapted to fit tightly around the nipples $S^3$, and to prevent the apron or outside receptacle $S^{15}$ from guiding dirt or foreign material to the cell mouth, I provide ribs $S^{18}$ around the outlets of the apertures $S^{16}$, which serve to retain any sediment which may be precipitated in the basin like receptacle $S^{15}$, and thus prevent the sediment from being carried back into the cells.

Depending from the lower side of the disk $T^5$ is an annular flange $w'$ having an indentation $w^2$ on one side, into which indentation a roller $w^3$ on a spring arm $w^4$ is held by a spring $w^5$, as shown, the function of this device being to provide a yielding lock bolt to hold the shaft $t$ in its normal position, and prevent its accidental movement, while at the same time being yieldable to the pressure of the handle $T'$ when it is required to revolve the shaft.

The trolley wheel carrier, which in this case, is a pole or arm, being mounted at a point adjacent to the motorman's support, constitutes a means for removing the trolley wheel from the main conductor instantly or whenever desired, as the motorman can readily grasp the pole with his hand and draw it down from the wire or restore it to position again, as he sees fit.

What I claim is:

1. In a locomotive car for mining and other purposes the combination of the track wheels, the low car body extending beyond the wheels to form a motorman's support, the storage battery resting upon the top of the said car body and extending from one end thereof toward the said support, the trolley, the trolley support adjacent to the motorman's support, the motors, the conductor from the trolley to the cells of the battery and the conductor from the trolley to the motors, substantially as set forth.

2. In a locomotive car for mining and similar purposes, the combination of the track wheels, the relatively low metallic car body on said wheels and projecting beyond the same to form a low support for the operator, the motors in the said body, the storage battery resting on the top of the said metallic car body, the trolley wheel, the means adjacent to the motorman's support for removing the trolley wheel from the main conductor, the conductor connecting the trolley conductor with the cells of the storage battery and the conductor connecting the trolley conductor with the motors, substantially as set forth.

3. In a locomotive for mining and other purposes the combination of the track wheels, the relatively low iron body extended at one end to provide a motorman's support, the motor within the said iron body and connected to the car axle, the storage battery above the iron body, the trolley adapted to receive current from the stationary conductor, and adapted to permit the electric connection with said stationary conductor to be broken, means adjacent to the motorman's support for breaking the electrical connection with the main conductor, the conductor connecting the trolley conductor with the motor, the conductor connecting the trolley conductor with the storage battery, the conductor connecting the battery with the motor, and means for controlling the passage of the current to the battery and from the battery to the motor, substantially as set forth.

4. In a locomotive car for mining and similar purposes, the combination of the track wheels, the relatively low iron car body supported on said wheels, and extended at one end to provide a motorman's platform, the motor within the said car body, the storage battery above the motor, the main conductor, the trolley contacting therewith, the universal joint for the trolley situated above the storage battery a conductor for connecting the trolley conductor with the storage battery, a conductor for connecting the trolley conductor with the motors independent of the battery, and means for controlling the passage of the current from the trolley conductor through the battery and the motor, substantially as set forth.

5. The combination of the car, the propelling motor thereon, the storage battery thereon, the traveling trolley, the trolley conductor, the conductor from the trolley circuit to the battery, the means for controlling current through the said conductor to the battery, a conductor connecting the said battery with the return part of the circuit, a conductor for connecting the trolley circuit with the motor, and means for connecting the battery at will with the motor, substantially as set forth.

6. The combination of the car, the motor on the car for propelling it, the storage battery on the car, the main circuit having a current feeding part and a current return part, the trolley or contact and its branch conductor, the conductor extending from the trolley circuit to the battery, the conductor extending from the battery to the return part of the circuit, the conductor connecting the motor with the trolley conductor and two independent controllers, one for regulating current passing through the trolley conductor to the motor, and one for regulating the current passing through the storage battery to the motor, substantially as set forth.

7. The combination of the car, the propelling motor on the car, the storage battery on the car, the stationary current supplying circuit having a feeding part and a return part, the trolley or traveling contact, the conductor connecting the battery with the trolley circuit, the conductor connecting the motor with the trolley circuit, the independent controllers in the last said circuits, and the arc divider in the motor circuit, substantially as set forth.

8. The combination of the car, the propelling motor thereon, the stationary electric conductor having a feeding part and a return part, the trolley traveling contact with its circuit section, the conductor connecting the trolley circuit section with the motor, the controller having a series of stationary contacts, and a series of rotary contacts, the contacts being arranged substantially as set forth, whereby when the current is being cut out from the machine the said contacts will act alternately relative to the two ends of the series, substantially as described.

9. In an electric locomotive, the combination of the motor, the storage battery, on the car, the means for supplying current from a generator to either said motor or said battery or both simultaneously, the controller for regulating the passage of the current to the motor, and an independent controller for regulating the passage of the current from the storage battery to the motor, substantially as set forth.

10. In an electric locomotive, the combination of the motor, on the car, the storage battery on the car, the main line conductor, the trolley for carrying current, either to the said battery or to the said motor, the controller for the current passing from the trolley to the motor, and having adjustable contacts, the controller for regulating the current from the battery to the motor, and means for interlocking the two controllers to hold one of them out when the other is in action, as set forth.

11. In an electric locomotive, the combination of the car, the propelling motor on the car, the storage battery on the car, the traveling contact adapted to convey current from the external conductor to the motor, a branch circuit connecting the traveling contact with the battery, means controlled by the current from the traveling contact for admitting more or less current to the battery, substantially as set forth.

12. In an electric locomotive, the combination of the car, the propelling motor on the car, the storage battery, the traveling contact for conducting the current from the external conductor to the motor, a branch circuit from the traveling contact to the battery, a resistance for the battery, means for throwing more or less of said resistance into circuit with the battery, and means for cutting the battery out of circuit with the contact, substantially as set forth.

13. In an electric locomotive, the combination of the car, the motor on the car, the storage battery, the traveling contact adapted to bring current from the external conductor to the motor, the branch circuit from the traveling contact to the battery, the resistance in said branch circuit, the electro-magnet in the said branch circuit, means actuated by said magnet for varying the said resistance, substantially as set forth.

14. In an electric locomotive, the combination of the car, the motor on the car, the storage battery on the car, the traveling contact adapted to convey current from an external circuit to the motors, the branch circuit from said traveling contact to the battery, the resistance in the motor circuit, the resistance in the battery circuit, two independent resistance varying mechanisms, and the controlling or commutating mechanism for connecting up the component parts of the storage battery under different conditions, substantially as set forth.

In testimony whereof I affix my signature in presence of two witnesses.

ALEXANDER PALMROS.

Witnesses:
LEOTA I. SAYLOR,
ENOS HUTCHINS.